United States Patent
Gregerson

(10) Patent No.: US 11,779,866 B2
(45) Date of Patent: Oct. 10, 2023

(54) MODULAR FILTER MANIFOLD

(71) Applicant: ENTEGRIS, INC., Billerica, MA (US)

(72) Inventor: Barry L. Gregerson, Deephaven, MN (US)

(73) Assignee: ENTEGRIS, INC., Billerica, MA (US)

( * ) Notice: Subject to any disclaimer, the term of this patent is extended or adjusted under 35 U.S.C. 154(b) by 188 days.

(21) Appl. No.: 17/232,780

(22) Filed: Apr. 16, 2021

(65) Prior Publication Data

US 2021/0331104 A1    Oct. 28, 2021

Related U.S. Application Data

(60) Provisional application No. 63/016,341, filed on Apr. 28, 2020.

(51) Int. Cl.
B01D 35/30 (2006.01)

(52) U.S. Cl.
CPC ...... B01D 35/306 (2013.01); *B01D 2201/302* (2013.01); *B01D 2201/304* (2013.01); *B01D 2201/4076* (2013.01); *B01D 2201/4092* (2013.01)

(58) Field of Classification Search
CPC ............ B01D 35/306; B01D 2201/302; B01D 2201/304; B01D 2201/4076; B01D 2201/4092; B01D 2201/4023; B01D 29/52; B01D 35/301
See application file for complete search history.

(56) References Cited

U.S. PATENT DOCUMENTS

| | | | |
|---|---|---|---|
| 6,969,462 B2 | 11/2005 | Liang | |
| 7,413,668 B2 | 8/2008 | Reid | |
| 7,981,289 B2 | 7/2011 | Tadlock | |
| 8,636,903 B2 | 1/2014 | Evanovich | |
| 9,162,187 B2 | 10/2015 | Volker | |
| 9,573,092 B2 | 2/2017 | Pruneri | |
| 10,550,742 B2 | 2/2020 | Zuerker | |
| 10,654,736 B2 | 5/2020 | Foster | |
| 2004/0251192 A1* | 12/2004 | Fritze | B01D 61/18 210/232 |
| 2008/0185323 A1 | 8/2008 | Kargenian | |
| 2008/0308487 A1 | 12/2008 | Thienel | |
| 2010/0243551 A1 | 9/2010 | Ruprecht | |
| 2015/0008173 A1 | 1/2015 | Lee | |
| 2015/0151222 A1 | 6/2015 | Simmons | |

(Continued)

FOREIGN PATENT DOCUMENTS

| CN | 201317693 Y | 9/2009 |
|---|---|---|
| CN | 101578126 B | 5/2013 |
| CN | 205061719 U | 3/2016 |

(Continued)

*Primary Examiner* — Waqaas Ali

(57) ABSTRACT

A modular filter manifold includes one or more plates, each plate including connections for one or more filters on a first side, and connections for fluid lines on a second side opposite the first. At least two fluid line connections are provided for each filter connection, with a fluid passage through the plate for each fluid line connection. Each of the fluid passages are independent of one another. The manifold plates can be joined to a support structure to form a manifold to which filters can be attached. Piping can be connected to the fluid line connections to allow flow through the filters in series or parallel flow.

15 Claims, 13 Drawing Sheets

(56) References Cited

U.S. PATENT DOCUMENTS

2019/0144298 A1 5/2019 Chen
2019/0275450 A1 9/2019 Singh

FOREIGN PATENT DOCUMENTS

| CN | 215539036 U | 1/2022 |
| DE | 3909402 A1 | 9/1990 |
| DE | 102010031341 A1 | 1/2012 |
| KR | 101298595 B1 | 8/2013 |
| TW | M273385 U | 8/2005 |
| WO | 2016074630 A1 | 5/2016 |

* cited by examiner

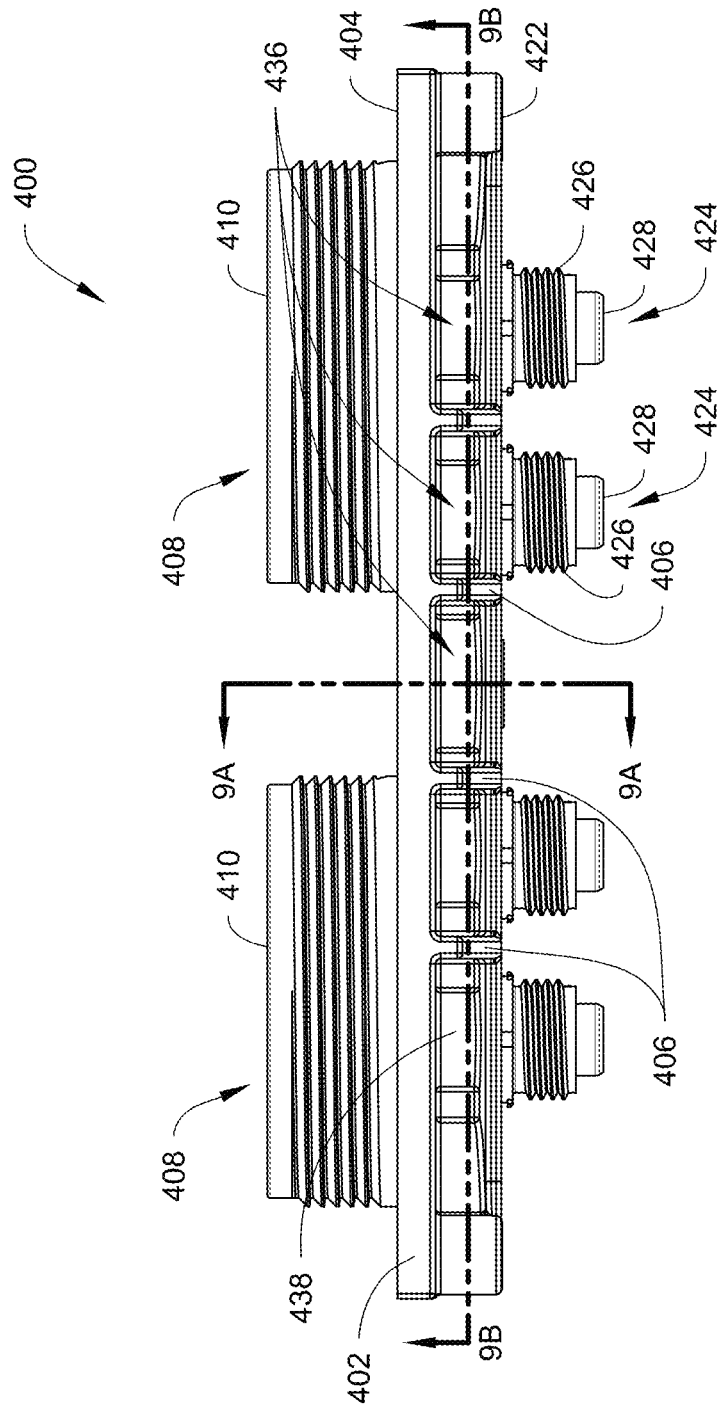

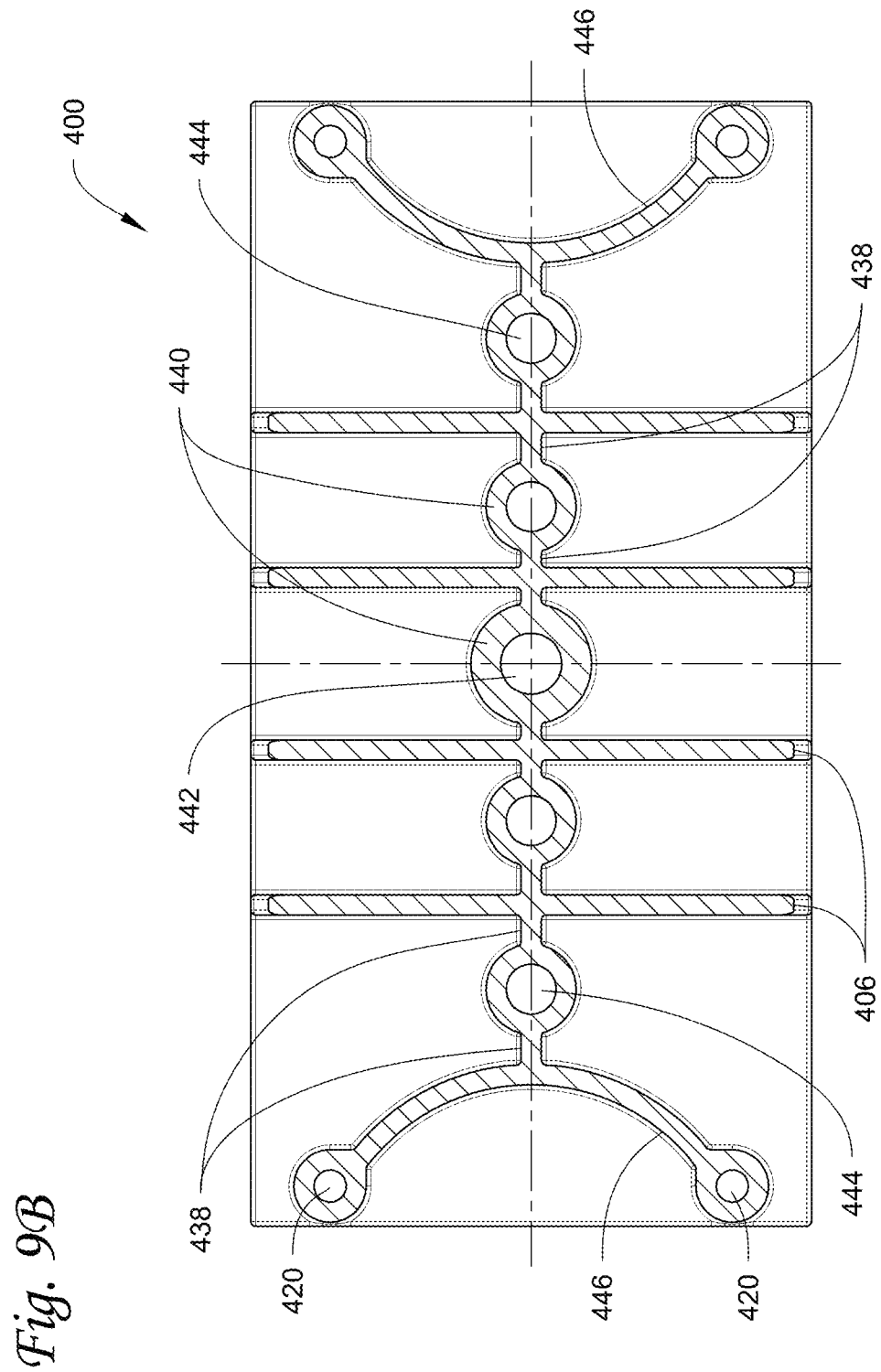

MODULAR FILTER MANIFOLD

This application claims the benefit of U.S. Application No. 63/016,341 filed on Apr. 28, 2020, which is hereby incorporated by reference in its entirety.

FIELD

This disclosure is directed to a modular filter manifold including one or more plates, and methods of manufacture thereof.

BACKGROUND

Filters in applications such as chemical processes, semiconductor manufacturing, and the like can be provided in manifolds allowing for the connections of multiple filters. These manifolds typically include all piping in a set configuration and contain a distinct, specific number of filter connections, such as 6 or 8 filter connections. These manifolds can thus be bulky, requiring a large space within an environment where floor space is at a premium, and are typically not suited to smaller applications where only a couple filters are needed.

SUMMARY

This disclosure is directed to a modular filter manifold including one or more plates, and methods of manufacture thereof.

By using modular plates to provide the connections for the filter and the fluid lines, manifold assemblies can be provided in more customizable and space-efficient forms. The number of modular plates can be selected based on size constraints and numbers of filters that need to be supported, allowing the number of filters to readily be varied from installation to installation. By providing direct, vertical connections between piping and filters, low-flow "dead zones" can be reduced or eliminated compared to manifolds and manifold assemblies where there is flow in a horizontal direction. The modular plates can be structured to facilitate connection of piping to each of the filters individually or in parallel or series arrangements based on the particular application where the filters are being used.

In an embodiment, a filter manifold includes at least one manifold plate. The manifold plate includes a plate body having a first side and a second side, the second side opposite the first side. The manifold plate also includes at least two filter connections on the first side of the plate body, each filter connection including an outer wall and a divider. The manifold plate further includes at least two fluid line connectors extending from the second side for each of the at least two filter connections. Each of the fluid line connectors includes a fluid passage passing through the manifold plate in a thickness direction of the plate body. Each fluid passage includes an opening at the first side that is located within the outer wall or the divider of one of the filter connections. For each filter connection, at least one of the openings at the first side is located within the divider and at least one of the openings at the first side is located between the divider and the outer wall Each of the fluid passages of the fluid connectors is an independent path for fluid flow.

In an embodiment, the filter manifold includes a plurality of the manifold plates.

In an embodiment, the fluid line connectors that have openings located between the divider and the outer wall of two of the at least two filter connections are separated by a distance that is smaller than a distance between the fluid line connectors having openings located within the divider of each of said two of the at least two filter connections.

In an embodiment, an outer side of each of the outer walls includes threading, the filter manifold further including a locking ring configured to engage the threading. In an embodiment, the filter manifold further includes a cap configured to cover one of the filter connections and wherein the locking ring is configured to retain the cap and a seal between the cap and one of the filter openings. In an embodiment the locking ring includes one or more engagement features on an outer side of the locking ring. In an embodiment, the locking ring includes one or more engagement features on an upper surface of the locking ring.

In an embodiment, the one or more manifold plates include a fluoropolymer. In an embodiment, the one or more manifold plates include a melt-processable polymer.

In an embodiment, the plate body includes a basin surrounding the filter connections on the first side of the plate body. In an embodiment, the filter manifold further includes a drain fluid passage extending from the basin on first side to a connector provided on the second side of the plate body.

In an embodiment, the filter manifold includes a plurality of void features extending into the plate body formed on one or more side walls of the plate body, the side walls each extending between the first side and the second side of the plate body. In an embodiment, the plurality of void features are each separated from one another by one or more ribs. In an embodiment, each of the ribs extends from one of the side walls to an opposite side wall, and each of the ribs passes between two of the fluid line connectors. In an embodiment, the first side of the plate body has an area greater than an area of the second side.

In an embodiment, a method of assembling a filter manifold includes providing one or more manifold plates. Each of the manifold plates includes a plate body having a first side and a second side, the second side opposite the first side. Each of the manifold plates also includes at least two filter connections on the first side of the plate body, each filter connection including an outer wall and a divider. Each of the manifold plates further includes at least two fluid line connectors extending from the second side for each of the at least two filter connections, each of the fluid line connectors including a fluid passage passing through the manifold plate in a thickness direction of the plate body, each fluid passage including an opening at the first side that is located within the outer wall or the divider of one of the filter connections. For each filter connection, at least one of the openings at the first side is located within the divider and at least one of the openings at the first side is located between the divider and the outer wall. Each of the fluid passage of the fluid connectors being an independent path for fluid flow. The method further includes connecting the one or more manifold plates to a support structure, connecting piping to at least some of the fluid line connectors of the one or more manifold plates, and connecting a filter to one of the filter connections of the one or more manifold plates.

In an embodiment, each of a plurality of filters are connected to one of the filter connections of the one or more manifold plates. In an embodiment, the piping is connected such that each of the plurality of filters are connected with one another such that a fluid flows the plurality of filters in series. In an embodiment, the piping is connected such that at least some of the plurality of filters are connected such that a fluid flows through said at least some of the plurality of filters in parallel with one another.

In an embodiment, the method further includes installing a cap in each of the filter connections to which a filter has not been connected.

DRAWINGS

FIG. 8 shows a side view of the manifold plate according to the embodiment of FIG. 7.

FIG. 9B shows a sectional view of a manifold plate along a horizontal plane according to the embodiment of FIG. 7.

DETAILED DESCRIPTION

This disclosure is directed to a modular filter manifold including one or more plates, and methods of manufacture thereof.

Figure 1:
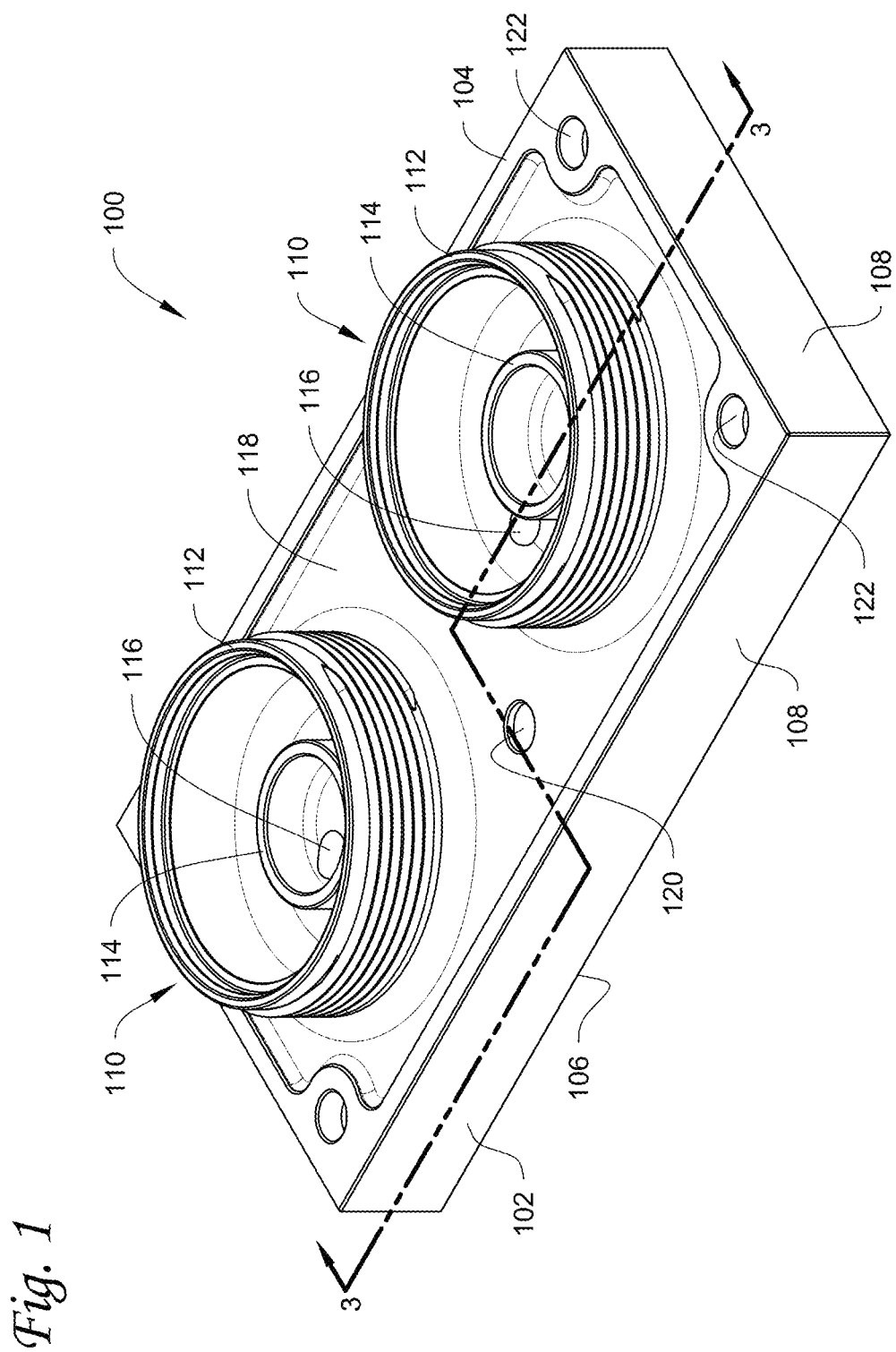
FIG. 1 shows a perspective view of a manifold plate according to an embodiment.

FIG. 1 shows a perspective view of a manifold plate according to an embodiment. Manifold plate 100 includes a plate body 102 having a first side 104 and a second side 106 with side walls 108 extending from the first side 104 to the second side 106. On the first side, two filter connections 110 are provided. As used herein, the term "filter connection" refers to a connection feature for attaching a filter housing or a filter cartridge. Each filter connection includes an outer wall 112 and a divider 114. First side fluid passage openings 116 can be located within the outer wall 112 and/or divider 114. First side 104 can include a basin 118 and a drain opening 120. The manifold plate 100 further includes mounting openings 122.

Manifold plate 100 is configured to form a portion of a modular filter manifold. The manifold plate 100 provides structure allowing connection of filters and piping configured to provide fluids (i.e. liquids or gases) to the filters or receive fluids from those filters. In an embodiment, manifold plate 100 is formed of a thermoplastic polymer material. In an embodiment, the manifold plate 100 is formed by machining a compression-molded polymer material. In an embodiment, the manifold plate 100 is formed by injection molding. In an embodiment, the manifold plate 100 includes one or more fluoropolymers. Non-limiting examples of fluoropolymers that can be used in manifold plate 100 include polytetrafluoroethylene (PTFE) or perfluoroalkoxy alkane (PFA). In an embodiment, the manifold plate 100 includes one or more melt-processable polymers. Non-limiting examples of melt-processable polymers that can be used in manifold plate 100 include PFA and polypropylene (PP).

Manifold plate 100 includes plate body 102. The plate body 102 includes a first side 104 and a second side 106 opposite the first side 104. The plate body can have any suitable shape for providing the filter connections 110 and presenting mounting openings 122 in a suitable position for attachment to a support structure. In the embodiment shown in FIG. 1, the plate body 102 is generally rectangular in shape. Plate body 102 has a thickness, with side walls 108 extending from the first side 104 to the second side 106. In an embodiment, the side walls 108 can be vertical, with first and second sides 104 and 106 having the same size and shape. In an embodiment, the side walls 108 can be angled, with the first and second sides 104 and 106 having different shapes and/or sizes.

Filter connections 110 are provided on first side 104 of the plate body 102. Filter connections 110 are configured to allow connection of filters to the filter manifold 100. The filter connections include outer wall 112. Outer wall 112 defines the perimeter of the filter connection 110. Outer wall 112 can include features for attachment of the filter, such as threading, or some other means of rotatable engagement, to allow a locking ring to attach the filter to filter connection 110. Dividers 114 are provided within each filter connection 110. Dividers 114 are configured to separate an inlet flow side where fluid flows into the filter joined to the filter connection 110 and an outlet flow side where fluid exits the filter. Divider 114 can have any suitable shape and size capable of dividing the inlet and outlet flow sides from one another when a filter is attached to the filter connection. In an embodiment, the divider 114 is a wall having the same general shape as outer wall 112, though smaller, and can be concentric with outer wall 112 or offset from a center of outer wall 112. In this embodiment, the divider 114 can be shorter than outer wall 112. First side fluid passage openings 116 can be provided in each filter connection 110. In an embodiment, first side fluid passage openings 116 can be provided on both the inlet flow side and the outlet flow side of dividers 114 for each filter connection 110. The first side fluid passage openings 116 connect to fluid passages extending through plate body 102 in a thickness direction to fluid line connectors, as discussed below and shown in FIGS. 2 and 3.

Figure 2:
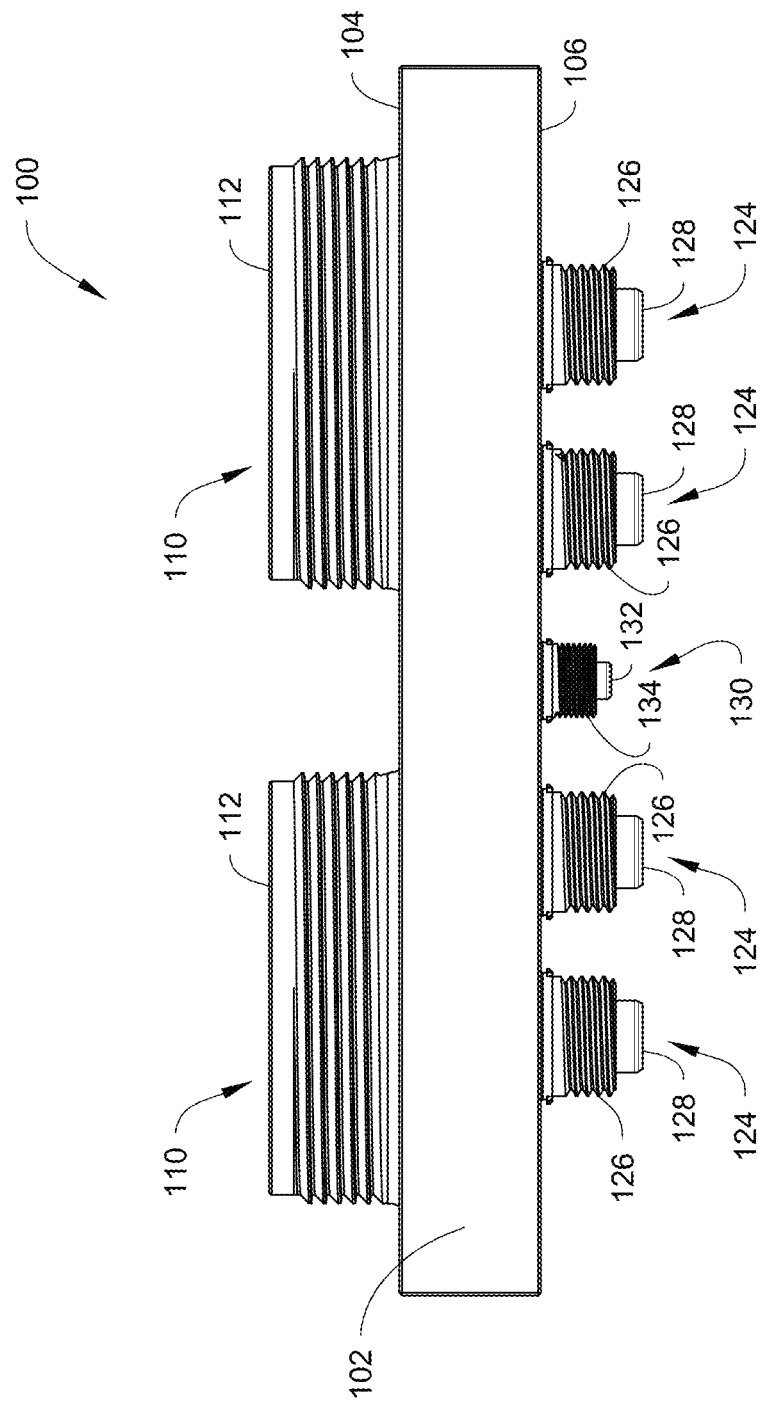
FIG. 2 shows a side view of the manifold plate according to the embodiment of FIG. 1.
Figure 3:
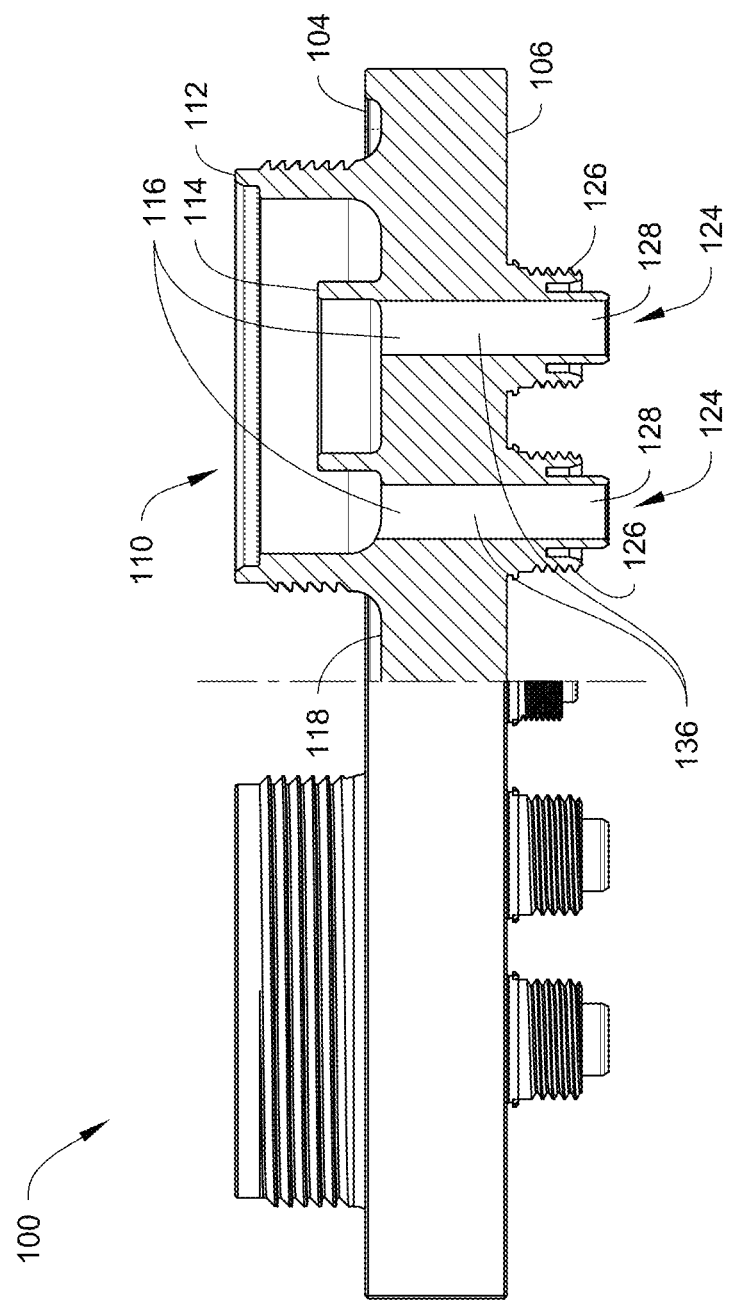
FIG. 3 shows a partial sectional view of a manifold plate according to the embodiment of FIG. 1.

Optionally, basin 118 can be formed in first side 104 of the plate body 102. Basin 118 can be a depression formed in the plate body 102. Basin 118 can be configured to catch leakage or drips from the system where the manifold plate 100 is included, for example receiving dripping or leakage from the filters installed into the manifold plate 100. A drain opening 120 can be provided in basin 118. The drain opening 120 can open to a fluid passage passing through plate body 102, connecting to a drain line on the second side 106. The connection to a drain line is shown in FIGS. 2 and 3 and described below. In an embodiment, the basin 118 can include a slope or curved shape directing liquid towards the drain opening 120.

Mounting openings 122 are structural features included in the manifold plate 100 that are configured to accept a fastener or engagement feature to allow the manifold plate 100 to be secured to a support structure. The mounting openings 122 can be, for example, holes allowing screws to pass through, as shown in FIG. 1. In embodiments, the mounting openings 122 can be any suitable feature allowing the manifold plate 100 to be secured to the support structure, for example recesses, slots, or openings configured to receive engagement features such as flanges, tabs, snap-fit engagement features, or the like. The manifold plate 100 can be secured to the support structure to provide at least a portion of a filter manifold to which filters can be connected by way of the filter connections 110, with piping providing fluid to the filters connecting to an opposite side as discussed below.

FIG. 2 shows a side view of the manifold plate according to the embodiment of FIG. 1. In FIG. 2, the outer walls 112 of filter connections 110 are visible extending from the first side 104 of plate body 102. Fluid line connectors 124 are provided on second side 106 of the plate body 102. Each filter connection 110 can include two or more of the fluid line connectors 124. In the embodiment shown in FIGS. 1 and 2, two fluid line connectors 124 are provided for each filter connection 110. In this embodiment, one of the fluid line connectors 124 corresponding to a filter connection 110 is configured to be connected to an inlet fluid line and the other fluid line connector 124 corresponding to the filter connection 110 is configured to be connected to an outlet fluid line. The fluid line connectors 124 for a filter connection 110 can be located such that one of the fluid line connectors is located on an inlet side of divider 114 and the other is located on an outlet side of divider 114. For example, one of the fluid line connectors 124 of the filter connection 110 can be located within the perimeter of divider 114, and the other can be located between the divider 114 and the outer wall 112 of the filter connection 110. The fluid line connectors 124 can be arranged based on whether they are on an inlet side or an outlet side of divider 114, for example to facilitate piping connections in a manifold including one or more of the manifold plates 100. In an embodiment, the fluid line connectors 124 can be arranged such that two fluid line connectors 124 that are each on an inlet side of divider 114 in their respective filter connections 110 are adjacent to one another. In an embodiment, the fluid line connectors 124 can be arranged such that two fluid line connectors 124 that are each on an outlet side of divider 114 in their respective filter connections 110 are adjacent to one another. In embodiments, more than two fluid line connectors can be provided for each of filter connections 110. In such embodiments, two or more fluid line connectors can be provided on at least one of the sides of the divider 114.

Each fluid line connector 124 includes a fluid line connection feature 126 and a second side fluid passage opening 128. The fluid line connection feature 126 can be any suitable structure for allowing the connection of a fluid line to the fluid line connector 124, such as, as a non-limiting example, threading. In embodiments, other suitable connectors for fluid lines can be provided on the fluid lines and at fluid line connection feature 126, with non-limiting examples including sterile connectors, quick-disconnect connectors, flange-type connectors, and the like.

A drain line connector 130 can also be included on the second side 106. Drain line connector 130 includes a drain line fluid passage opening 132 and a drain line connection feature 134. The drain line fluid passage opening 132 is an opening of a fluid passage traveling through the plate body 102 from drain opening 120. The fluid passage can allow fluid in basin 118 to pass through plate body 102 into the drain line connected at drain line connector 130, for example so that it can be conveyed out of basin 118 by way of the connected drain line. The drain line connection feature 134 can be any suitable structure for allowing the connection of a drain line to the drain line connector 130, such as, as a non-limiting example, threading. In embodiments, other suitable connectors for fluid lines can be provided on the fluid lines and at drain line connection feature 134, with non-limiting examples including sterile connectors, quick-disconnect connectors, flange-type connectors, and the like.

FIG. 3 shows a partial sectional view of a manifold plate according to the embodiment of FIG. 1. In the sectional view of FIG. 3, the filter connection 110 including outer wall 112 and divider 114 can be seen on first side 104 of plate body 102. First side fluid passage openings 116 are provided on either side of the divider 114, such that a first side fluid passage opening 116 is provided on an inlet side of the divider 114 and another first side fluid passage opening 116 provided on the outlet side of the divider 114. Basin 118 can be seen as a depression into the first side 104 of plate body 102.

When a filter housing is attached to the filter connection 110, a portion of the filter cartridge or filter element can form a seal with divider 114 to separate the inlet and outlet sides of divider 114. The filter can be configured to accept flow at portions in communication with the inlet side of divider 114. The flow can be provided from a fluid line connected to the fluid line connector 124 corresponding to the first side fluid passage opening 116 located within the inlet side. The accepted flow passing through the filter and then being provided from the filter to the outlet side of the filter connection 110 as defined by the divider 114. The flow leaving the filter can pass out of the outlet side by way of the first side fluid passage opening located on the outlet side. In embodiments, the divider 114 can be contacted by one or more seals included in the filter to further separate inlet and outlet sides.

Fluid passages 136 each extend through the plate body 102 from one of the first side fluid passage openings 116 to one of the second side fluid passage openings 128. In an embodiment, the fluid passages 136 extend such that when the manifold plate 100 is in position to be used as a filter manifold, the fluid passages extend in a vertical direction. In an embodiment, the fluid passages 136 extend in a direction perpendicular to the plane of plate body 102. The fluid passages 136 having such an orientation can reduce the occurrence of low-flow regions during use of a filter manifold including the manifold plates 100. In an embodiment, the fluid passages 136 are each independent of one another. In an embodiment, no fluid passage 136 is connected to any other of the fluid passages 136. The fluid passages 136 can provide inlets for pre-filtered fluid or outlets for filtered fluid.

Figure 4:
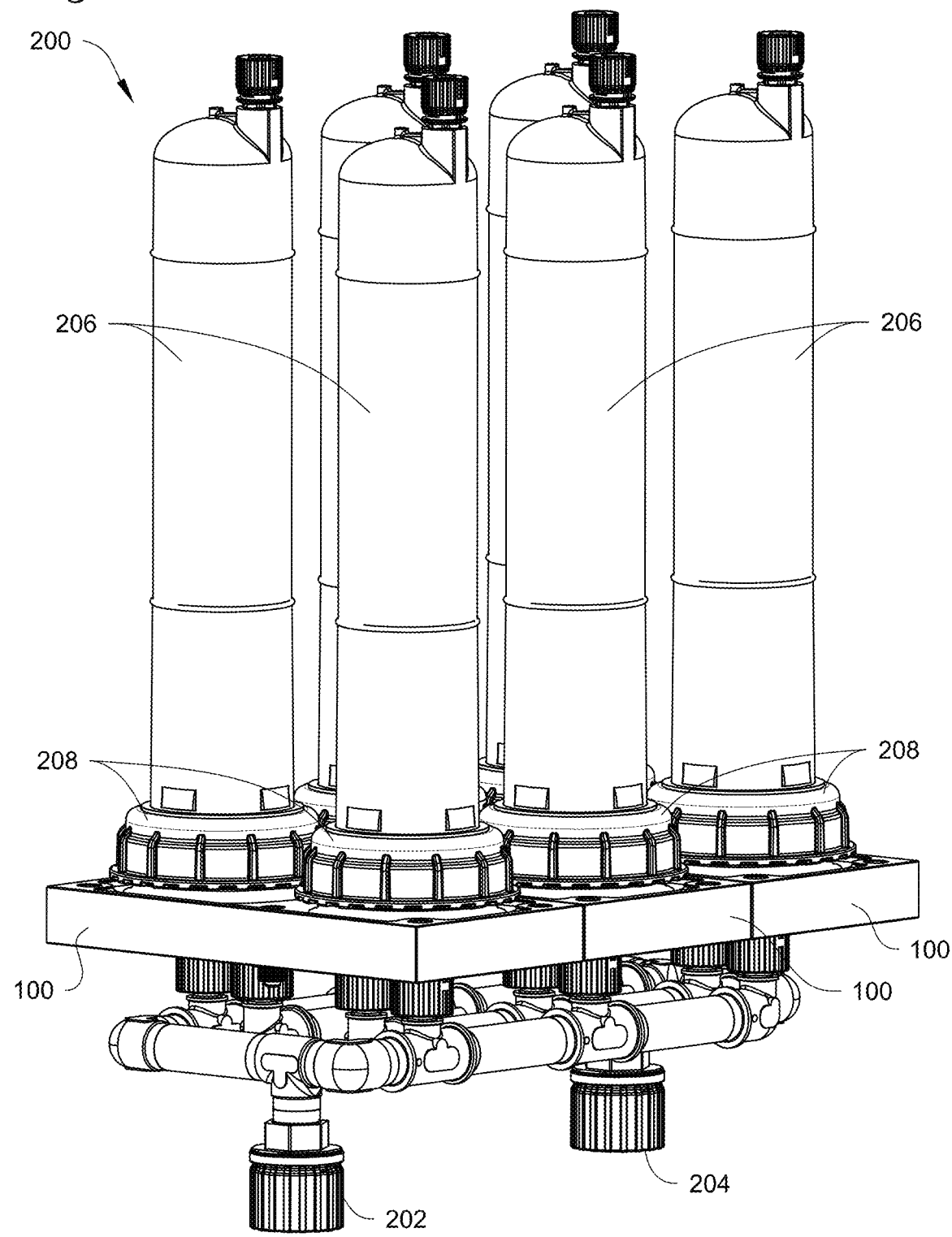
FIG. 4 shows a perspective view of a filter manifold according to an embodiment.

FIG. 4 shows a perspective view of a filter manifold according to an embodiment. Filter manifold 200 includes multiple manifold plates 100 as described above and shown in FIGS. 1-3. Filter manifold 200 further includes inlet piping 202 and outlet piping 204 connected to the fluid line connectors 124 of the manifold plates 100. Filters 206 are installed into the filter connections 110 of the manifold plates 100, to which they are secured by way of locking rings 208.

The manifold plates 100 of filter manifold 200 can be any number of manifold plates 100 sufficient to accommodate the number of filters 206 to be supported by the filter manifold 200. For example, where each manifold plate 100 includes two filter connections 110, the number of manifold plates 100 used in filter manifold 200 can be one half the number of filters 206 to be used in the filter manifold 200. In an embodiment, the manifold plates 100 can further be joined to a support structure (not shown) to secure the position and arrangement of filter manifold 200.

The inlet piping 202 is piping configured to be connected to a source of a fluid to be filtered through the filters 206 mounted in filter manifold 200. The inlet piping 202 can be configured to connect to the fluid line connectors 124 corresponding to the inlet sides of each of the filter connections 110 to which a filter 206 is connected. In an embodiment, the inlet piping 202 is configured such that the fluid flows through at least two (or more) of the filters 206 in parallel. In an embodiment, the inlet piping 202 is configured such that fluid passes through at least two (or more) of the filters 206 in series. In some embodiments, a first fluid may pass through one or more of the filters in the manifold assembly and a second fluid may pass through one or more different filters as the first fluid. In such embodiments, the filters receiving the first fluid and the filters receiving the second fluid may be piped individually and separately from one another. Thus, the disclosed manifolds allow for multiple piping configurations (in series, in parallel, and individual) that can be easily changed and accommodated.

Outlet piping 204 is piping configured to receive fluid leaving the fluid line connectors 124 corresponding to at least some of the outlet sides of the filter connections 110 to which a filter 206 is connected, and to convey the received fluid to an outlet. The outlet can be, for example, a tool using the received fluid in a chemical process.

Filters 206 can be inserted into some or all of the filter connections 110 provided on the manifold plates 100. The filters 206 can include an inlet portion and an outlet portion, separated by any suitable filter media. The filter media can be selected based on the particular application filters 206 are used in. The filters 206 can be replaceable cartridges, for example to allow replacement of filters based on reaching an end of a service life, based on changes in removal efficiency, or any other suitable reason for replacement. The inlet and outlet portions of the filters 206 can correspond to the division of each of filter connections 110 into inlet and outlet sides by divider 114, such that flow provided on an inlet side of the filter connection 110 is received at the inlet portion of the filter 206 and flow from the outlet portion of the filter 206 is received on the outlet side of filter connection 110. In an embodiment, filter 206 includes a portion that abuts, mates with, or seals to divider 114 to separate the inlet and outlet sides of the filter connection 110.

Filters 206 can be secured by way of locking rings 208. In an embodiment, the filters 206 include one or more engagement features such as flanges that allow retention by the locking ring 208. The locking ring 208 can interface with the filter connection 110 to form a mechanical connection joining the filter 206 to the filter connection 110, for example by having threading or other rotatable engagement that interfaces with threading provided on an outer surface of the outer wall 112 of a filter connection 110. The locking rings are discussed further below and shown in more detail in FIG. 9.

Figure 5:
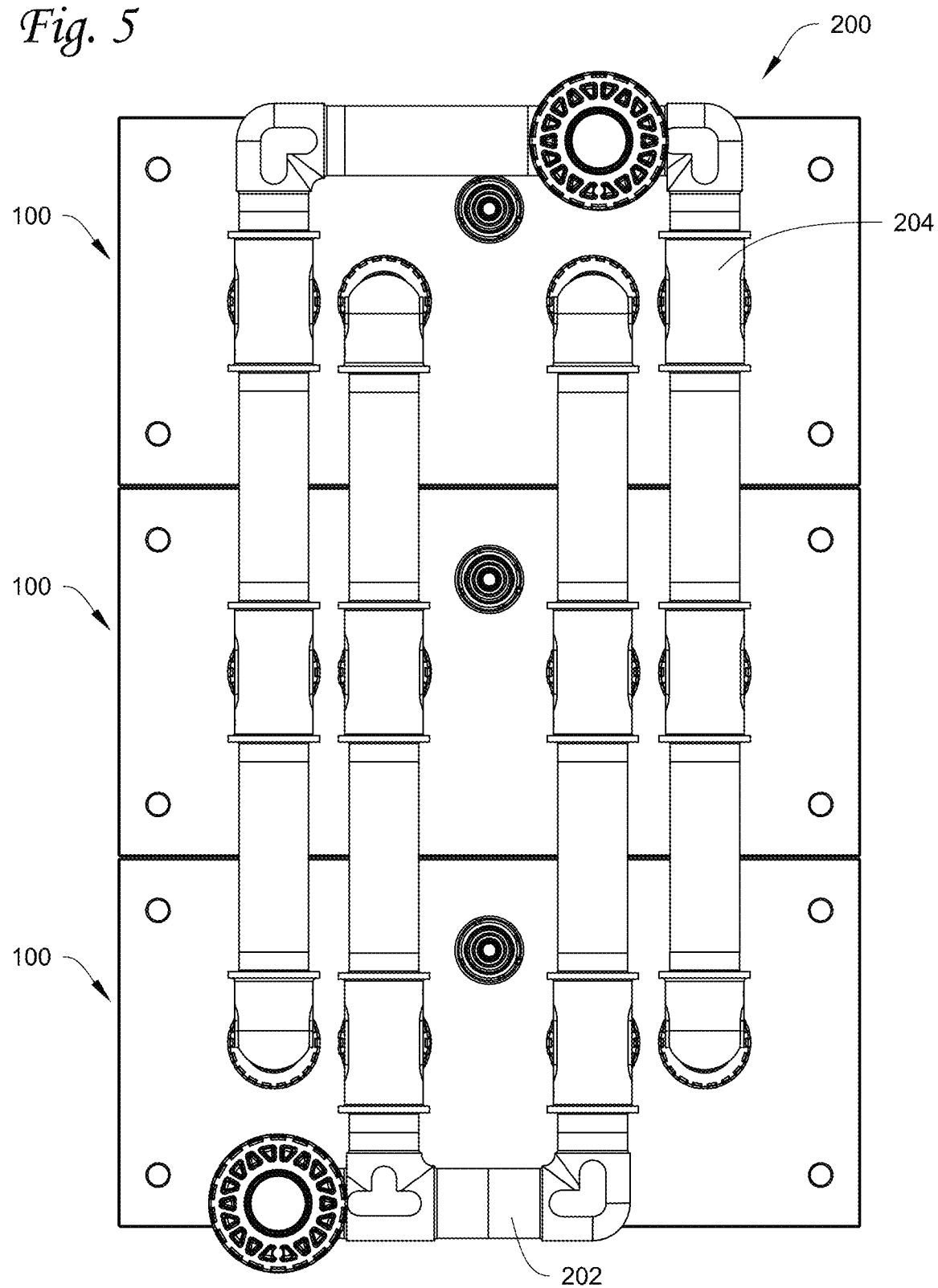
FIG. 5 shows a bottom view of the filter manifold according to the embodiment of FIG. 4.

FIG. 5 shows a bottom view of the filter manifold according to the embodiment of FIG. 4. In the view of FIG. 5, the particular position of inlet piping 202 and outlet piping 204 is visible. In the embodiment shown in FIG. 5, the inlet piping 202 and the outlet piping 204 are configured such that each of the filters 206 are in parallel with one another with respect to the flow of fluid into and through filter manifold 200. As noted above, inlet piping 202 and outlet piping 204 can also be configured for flow through the filters in series.

Figure 6:
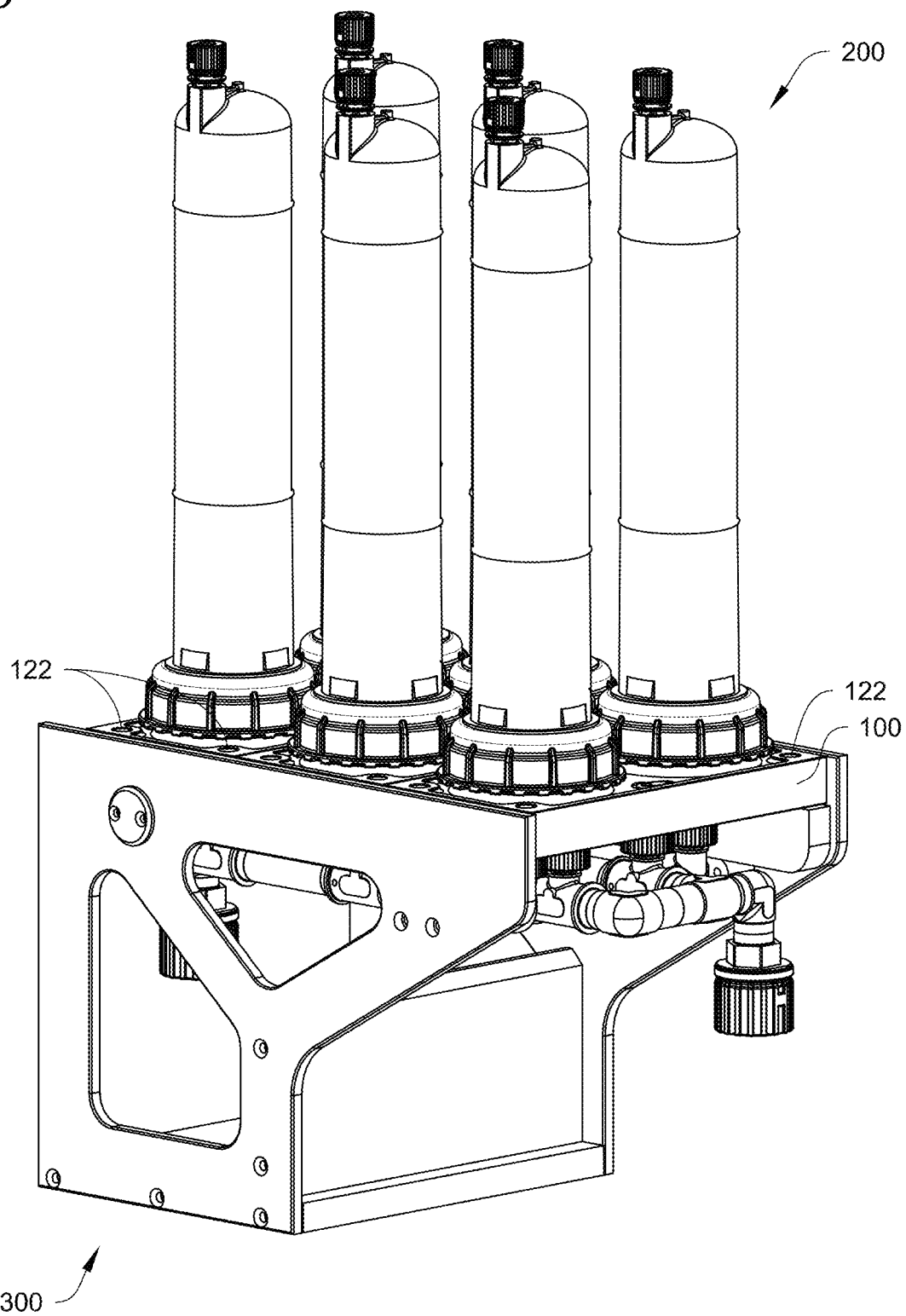
FIG. 6 shows the filter manifold according to the embodiment of FIG. 4 installed into a support structure.

FIG. 6 shows the filter manifold according to the embodiment of FIG. 4 installed into a support structure. Support structure 300 is a frame sized to support filter manifold 200. Support structure 300 can be configured to allow its attachment to another surface, for example by way of brackets or any suitable mechanical connector of portion thereof. Filter manifold 200 can be joined to support structure 300 by any suitable mechanical connection, for example by way of fasteners extending through mounting openings 122 of the manifold plates 100 included in filter manifold 200. The fasteners can be received, for example, in features such as screw holes provided on the support structure 300. In embodiments, other mechanical connections can be used, such as corresponding snap-fit features, slots and flanges or tabs, or the like, to retain manifold plates 100 making up a filter manifold 200 to the support structure 300.

Figure 7:
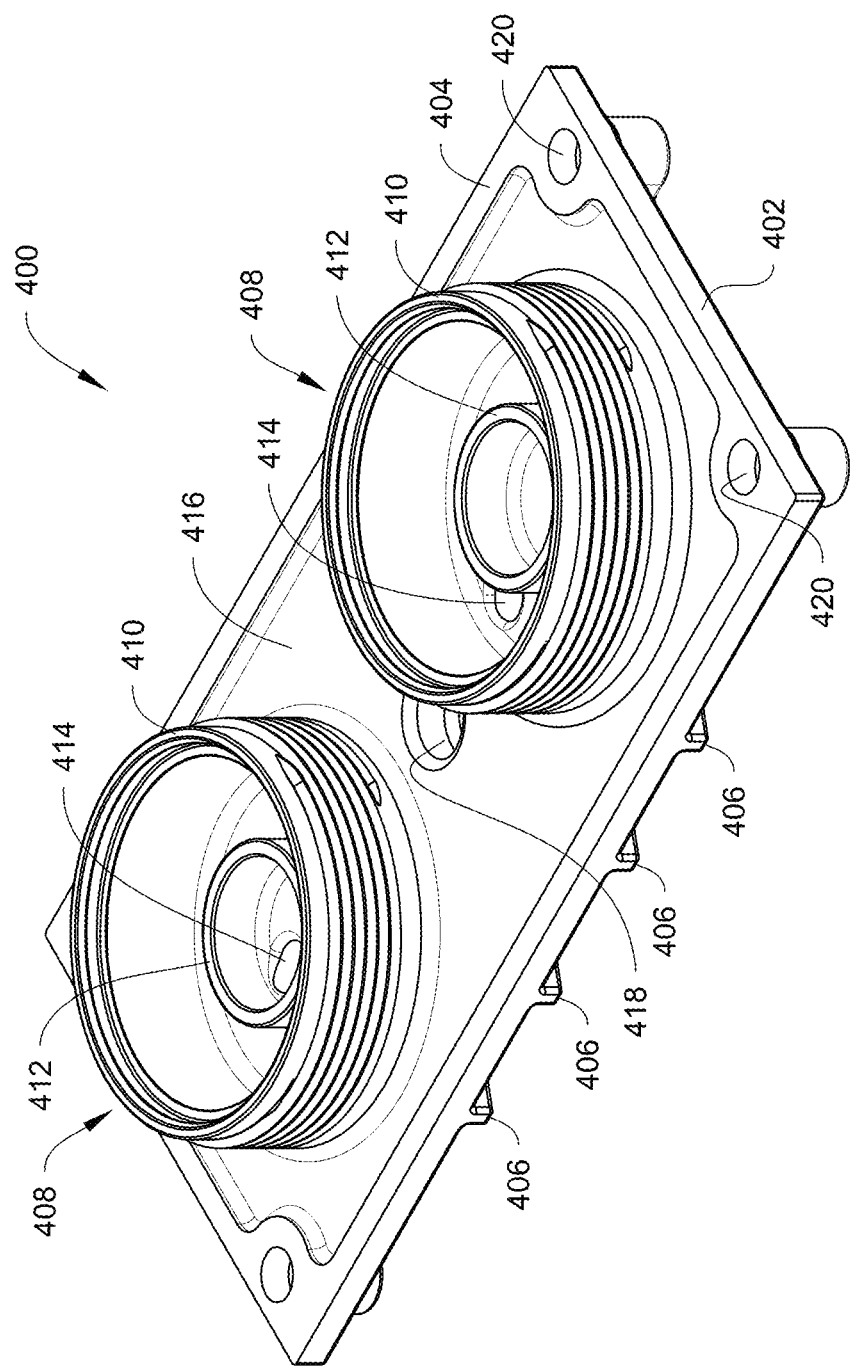
FIG. 7 shows a perspective view of a manifold plate according to an embodiment.

FIG. 7 shows a perspective view of a manifold plate according to an embodiment. Manifold plate 400 can be used in place of manifold plate 100 and can be included in filter manifolds such as filter manifold 200, connected to filters such as filters 208, and connected to support structures such as support structure 300 in the same manner as manifold plate 100, as described above and shown in FIGS. 1-6.

Manifold plate 400 can be made of a melt-processable polymer material, for example, perfluoroalkoxy alkane (PFA) or polypropylene (PP). Manifold plate 400 can be shaped to facilitate injection molding manufacturing.

Manifold plate 400 includes a plate body 402 having a first side 404 and a second side (visible in FIGS. 8 and 9 and described below). Manifold plate 400 includes a plurality of ribs 406 separating void features (visible in FIGS. 8 and 9 and described below) extending inwards into the plate body 402. First side 404 of plate body 402 includes a plurality of filter connections 408, each filter connection 408 including an outer wall 410, a divider 412, and first side fluid passage openings 414. Optionally, first side 404 includes a basin 416 recessed into the first side 404 and a drain opening 418 located within the basin. Manifold plate 400 further includes mounting openings 420.

Ribs 406 connect first side 404 to the second side of the plate body 402 and separate the void features from one another. Ribs 406 can extend across a width direction of the plate body 402. Ribs 406 can be distributed along the longitudinal axis of the plate body 402. The ribs 406 can be spaced according to requirements for void features within the plate body 402. In an embodiment, the ribs 406 can be spaced such that they do not intersect fluid passages that are formed extending through the plate body 402.

Filter connections 408 are provided on first side 404 of the plate body 402. Filter connections 408 are configured to allow connection of filters to the filter manifold 400. The filter connections include outer wall 410. Outer wall 410 defines the perimeter of the filter connection 408. Outer wall 410 can include features for attachment of the filter, such as threading or rotatable engagement to allow a locking ring to attach the filter to filter connection 408. Dividers 412 are provided in each filter connection 408. Dividers 412 are configured to separate an inlet flow side where fluid flows into the filter joined to the filter connection 408 and an outlet flow side where fluid exits the filter. Divider 412 can have any suitable shape and size capable of dividing the inlet and outlet flow sides from one another when a filter is attached to the filter connection. In an embodiment, the divider 412 is a wall having the same general shape as outer wall 410, though smaller, and concentric with outer wall 410. In this embodiment, the divider 412 can be shorter than outer wall 410. First side fluid passage openings 414 can be provided in each filter connection 408. In an embodiment, first side fluid passage openings 414 can be provided on both the inlet flow side and the outlet flow side of dividers 412 for each filter connection 408. The first side fluid passage openings 414 connect to fluid passages extending through plate body 402 in a thickness direction to fluid line connectors, as discussed below and shown in FIGS. 2 and 3.

Optionally, basin 416 can be formed in first side 404 of the plate body 402. Basin 416 can be a depression formed in the plate body 402. Basin 416 can be configured to catch leakage or drips from the system where the manifold plate 400 is included, for example receiving dripping or leakage from the filters installed into the manifold plate 400. A drain opening 418 can be provided in basin 416. The drain opening 418 can open to a fluid passage 442 passing through plate body 402, then connecting to a drain line. In an embodiment, the basin 416 can include a slope or curved shape directing liquid towards the drain opening 418.

Mounting openings 420 are structural features included in the manifold plate 400 that are configured to accept a fastener or engagement feature to allow the manifold plate 400 to be secured to a support structure. The mounting openings 420 can be, for example, holes allowing screws to pass through, as shown in FIG. 7. In embodiments, the mounting openings 420 can be any suitable feature allowing the manifold plate 400 to be secured to the support structure, for example recesses, slots, or openings configured to receive engagement features such as flanges, tabs, snap-fit engagement features, or the like. The manifold plate 400 can be secured to the support structure to provide at least a portion of a filter manifold to which filters can be connected by way of the filter connections 408, with piping providing fluid to the filters connecting to an opposite side as discussed below.

FIG. 8 shows a side view of the manifold plate according to the embodiment of FIG. 7. In the side view of FIG. 8, second side 422 of the plate body 402 is visible, and the outer walls 410 of filter connections 408 are also visible extending from the first side 404 of plate body 402. Each filter connection 408 can include two or more corresponding fluid line connectors 424. In the embodiment shown in FIGS. 7 and 8, two fluid line connectors 424 are provided for each filter connection 408. In this embodiment, one of the fluid line connectors 424 corresponding to a filter connection 408 is configured to be connected to an inlet fluid line and the other fluid line connector 424 corresponding to the filter connection 408 is configured to be connected to an outlet fluid line. The fluid line connectors 424 for a filter connection 408 can be located such that one of the fluid line connectors is located on an inlet side of divider 412 and the other is located on an outlet side of divider 412. For example, one of the fluid line connectors 424 of the filter connection 408 can be located within the perimeter of divider 412, and the other can be located between the divider 412 and the outer wall 410 of the filter connection 408. The fluid line connectors 424 can be arranged based on whether they are on an inlet side or an outlet side of divider 412, for example to facilitate piping connections in a manifold including one or more of the manifold plates 400. In an embodiment, the fluid line connectors 424 can be arranged such that two fluid line connectors 424 that each on an inlet side of divider 412 in their respective filter connections 408 are adjacent to one another. In an embodiment, the fluid line connectors 424 can be arranged such that two fluid line connectors 424 that each on an outlet side of divider 412 in their respective filter connections 408 are adjacent to one another.

Each fluid line connector 424 includes a fluid line connection feature 426 and a second side fluid passage opening 428. The fluid line connection feature 426 can be any suitable structure for allowing the connection of a fluid line to the fluid line connector 424, such as, as a non-limiting example, threading.

Void features 436 are areas recessed into the plate body 402. The void features 436 are separated by ribs 406. Void features 436 can be recessed into the plate body 402 until they reach a central support 438 or fluid passage walls 440 defining the fluid passages through plate body 402. The shape and size of void features 436 can be based on, for example, thermal properties of molds used to form manifold plate 400, mechanical properties of the manifold plate 400 such as resistance to deformation under pressure and/or weight, and the like.

Figure 9A:
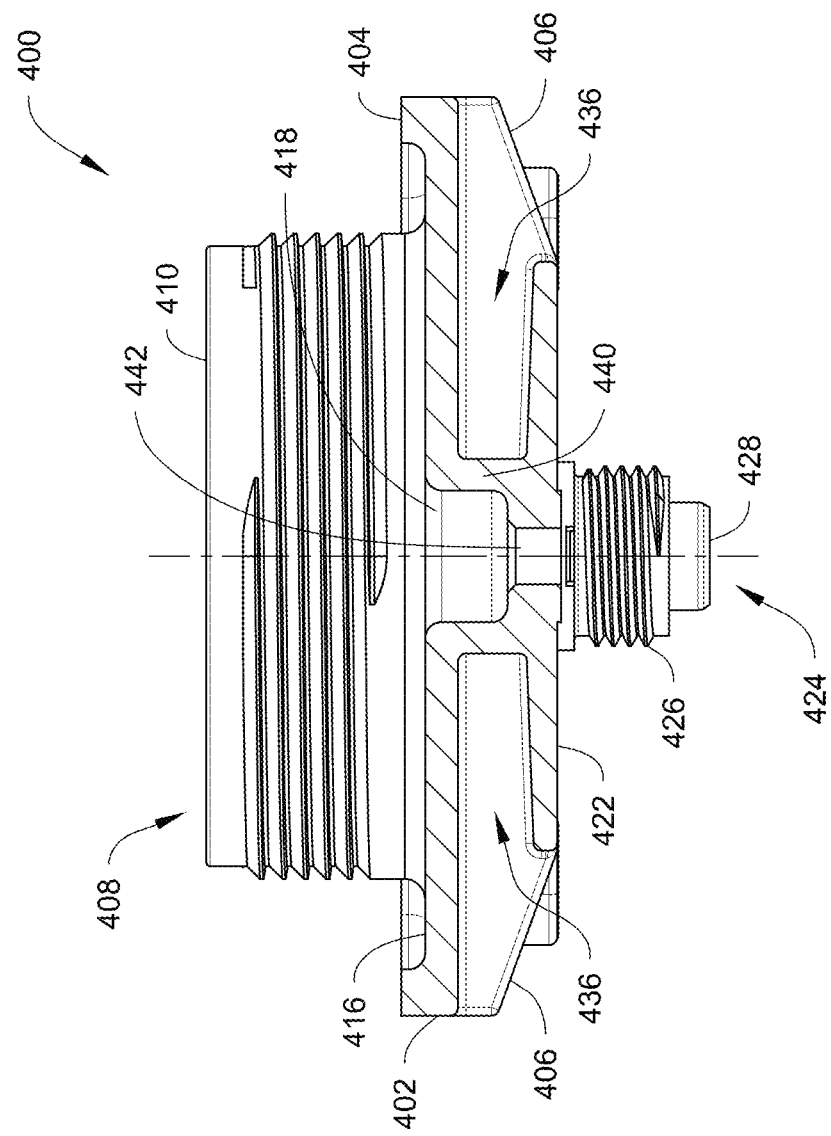
FIG. 9A shows a sectional view of a manifold plate along a vertical plane according to the embodiment of FIG. 7.

FIG. 9A shows a sectional view of a manifold plate according to the embodiment of FIG. 7 along line 9A-9A in FIG. 7. In the sectional view of FIG. 9A, a drain fluid passage 442 can be seen extending through plate body 402, defined by fluid passage walls 440. The fluid passage 442 allows fluid from basin 416 to pass through the plate body 402. Optionally, fluid passage 442 could extend into a drain line connector such as the drain line connector 130 described above, with this drain line connector provided on second side 422. The outer wall 410 of a filter connection 408 is visible on first side 404, along with fluid line connector 424 on second side 422. Ribs 406 can also be seen, partially defining void features 436.

FIG. 9B shows another sectional view of manifold plate according to the embodiment of FIG. 7 along line 9B-9B in FIG. 7. In sectional view of FIG. 9B, it can be seen how ribs 406 can extend across a width of body 402. Also seen in FIG. 9B are drain fluid passage 442 and fluid passages 444 that connect first side fluid passage openings 414 and second side fluid passage openings 428. Also seen in FIG. 9B are fluid passage walls 440 surrounding drain fluid passage 442 and fluid passages 444 as well as central support 438 formed between the fluid passage walls 440. Central support 438 provides structural support if manifold plate 400 is bent or flexed. In some embodiments, there can also be one of more arced ribs 446 connected to walls of mounting openings 4 and central support 38 can extend between fluid passage walls 440 and arced ribs 446.

Figure 10:
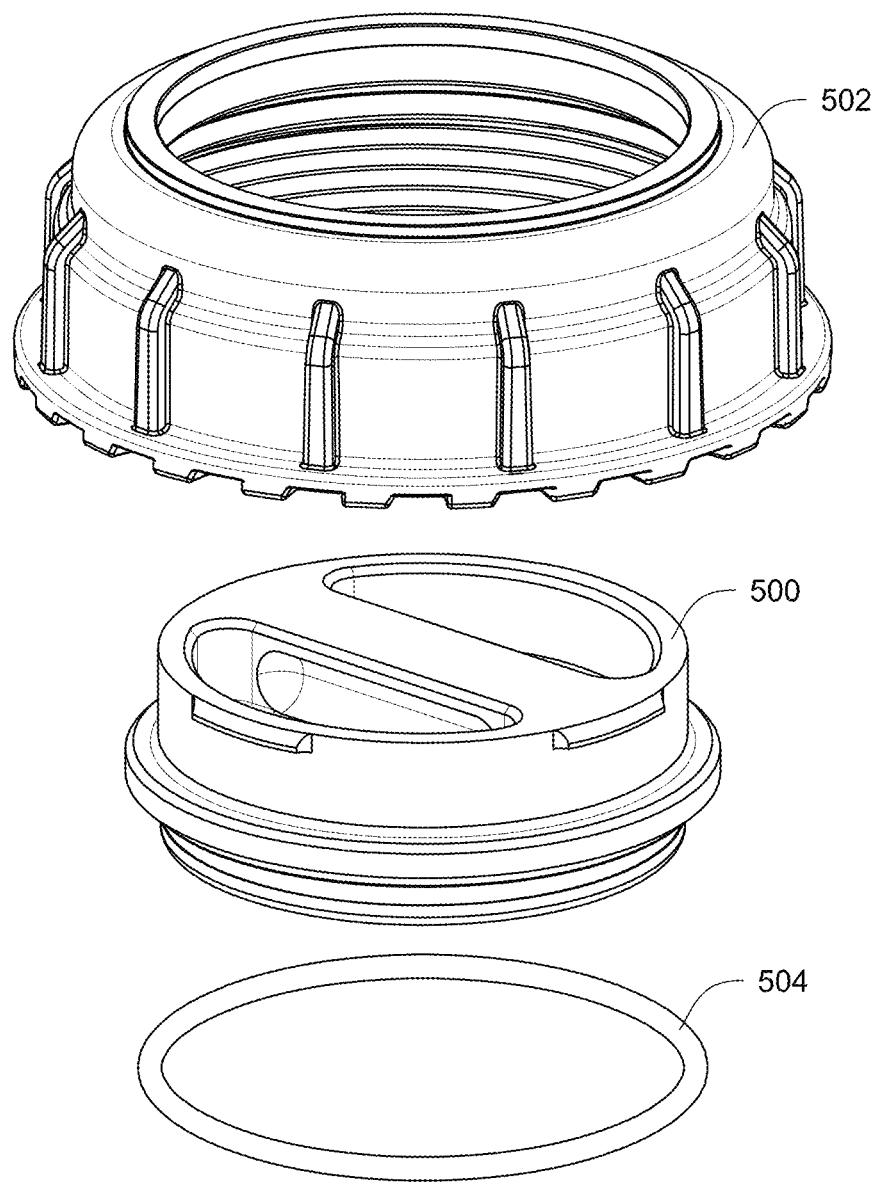
FIG. 10 shows a cap and a locking ring for a manifold plate according to an embodiment.

FIG. 10 shows a cap and a locking ring for a manifold plate according to an embodiment. Cap 500 can optionally be used with a manifold plate such as any described herein to cover one of the filter connections of that manifold plate, such as filter connection 110 of manifold plate 100 or filter connection 408 of manifold plate 400 as described above. Cap 500 can be shaped and sized such that it can fill the opening defined by the outer wall of one of those filter connections. Cap 500 can further be sized such that it can be held down to the outer wall of that filter connection by mechanical interference with a locking ring 502 that is joined to that outer wall, for example by engagement of threading. Optionally, a seal 504 can further be provided. Seal 504 can be any suitable seal such as a gasket or an O-ring that can be placed between cap 500 and the outer wall of the filter connection. Seal 504 can be sized such that it is compressed between cap 500 and the outer wall of the filter connection when locking ring 502 is tightened to the outer wall of the filter connection. In some embodiments, locking ring 502 can have one or more engagement features on an outer side of the locking ring and/or an upper surface of the locking ring for a wrench or tightening device to attach to for tightening/loosening the locking ring.

Figure 11:
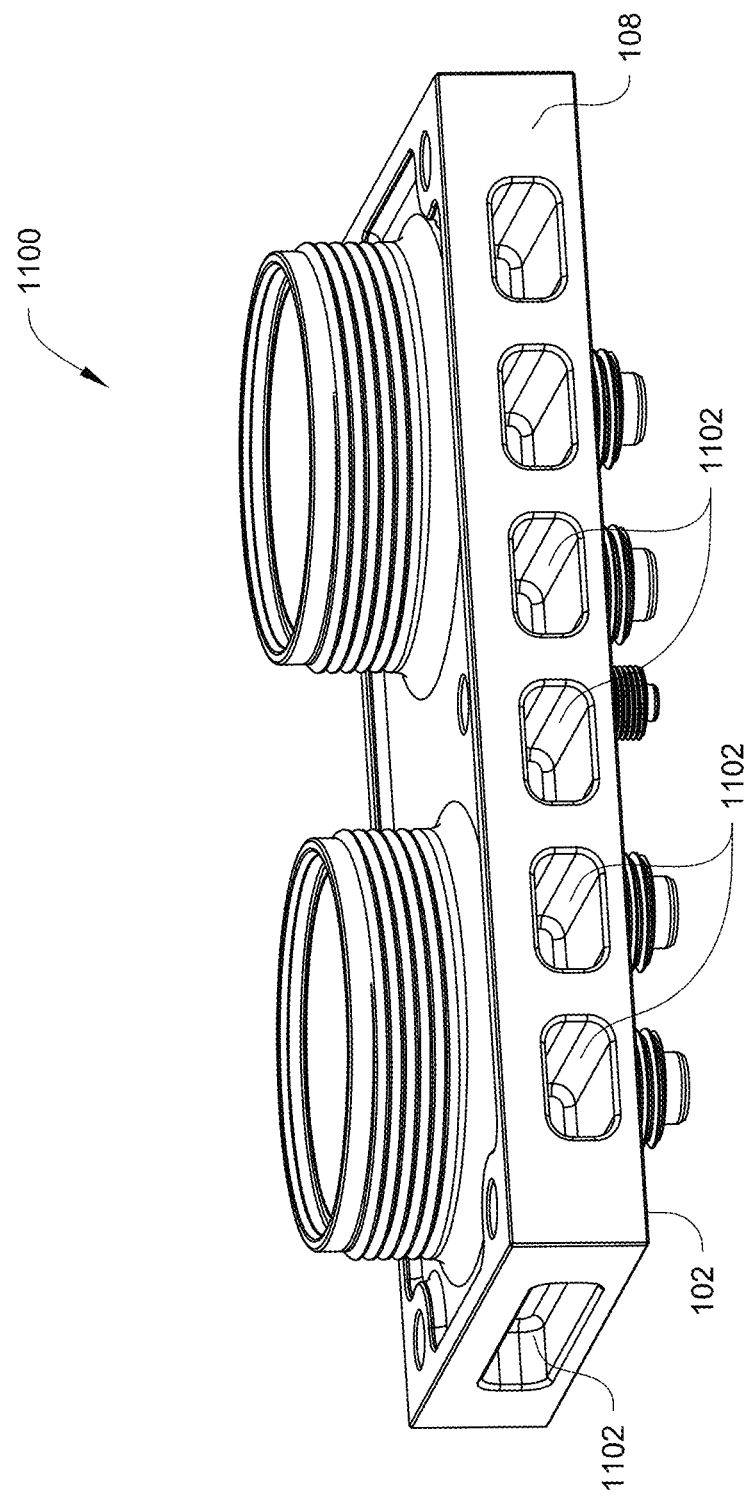
FIG. 11 shows a manifold plate according to an embodiment.

FIG. 11 shows a manifold plate according to an embodiment. Manifold plate 1100 is a manifold plate similar to manifold plate 100 described above and shown in FIGS. 1-3.

Manifold plate 1100 includes the features of manifold plate 100 as described above and further includes lightening cutouts 1102 that are provided to reduce the weight of the manifold. Each of the lightening cutouts 1102 are openings in the side walls 108 of the plate body 102. The lightening cutouts 1102 may not intersect or penetrate any of the fluid passages 136 or mounting openings 122. In an embodiment, the lightening cutouts 1102 can be produced by removal when machining manifold plate 1100. The lightening cutouts 1102 can have any suitable number, size, position, and arrangement to reduce a mass of the manifold plate 1100 without falling below threshold values for the resistance of manifold plate 1100 to deformation or other mechanical failure.

Figure 12:
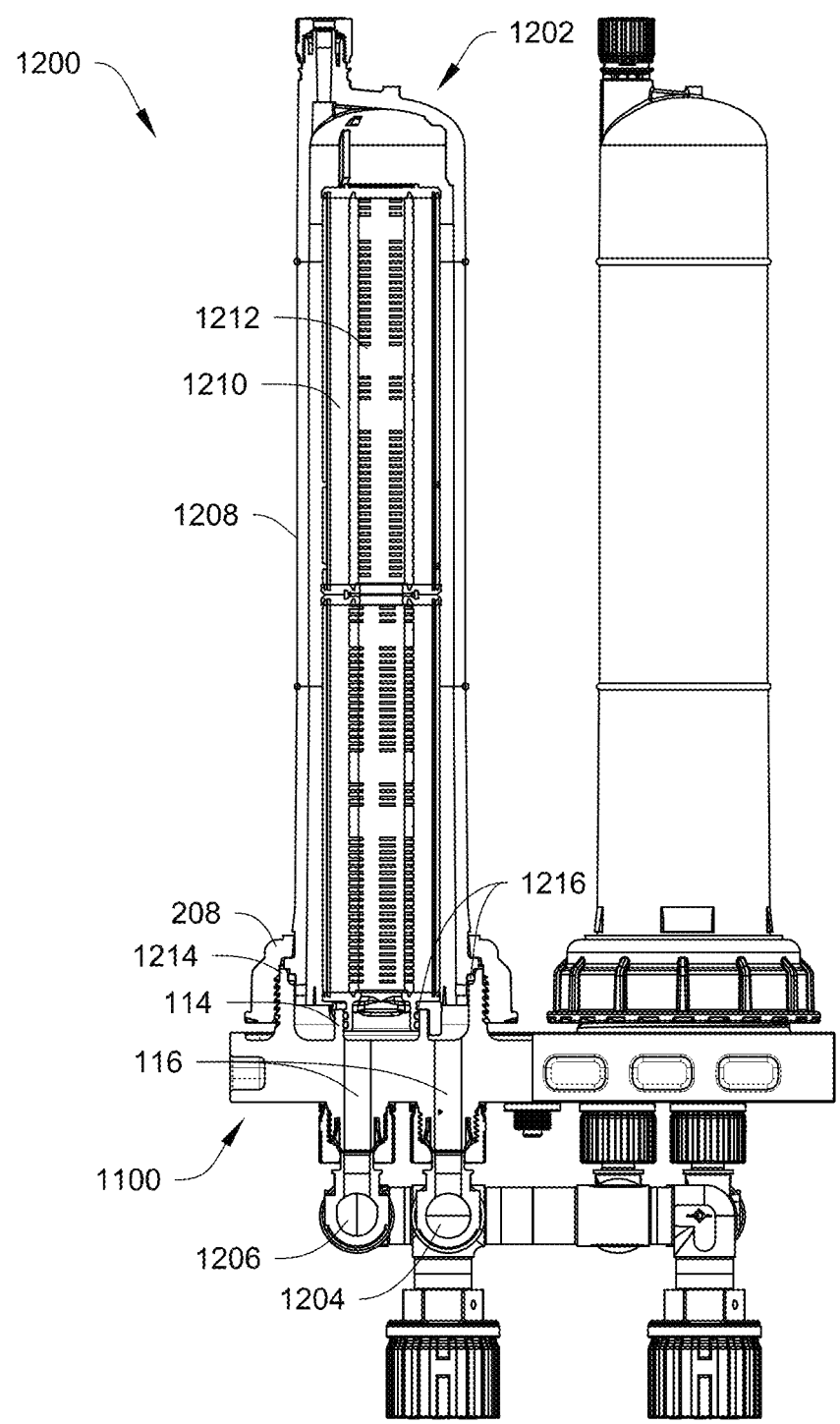
FIG. 12 shows a sectional view of the filter manifold according to FIG. 4.

FIG. 12 shows a sectional view of a filter manifold. Filter manifold 1200 includes manifold plate 1100 as described above and shown in FIG. 11. While manifold plate 1100 is used in the embodiment shown in FIG. 12, it is understood that any of the manifold plated described herein can be included in filter manifold 1200. A filter 1202 is joined to manifold plate 1100. Filter 1202 is retained by locking ring 208. Inlet piping 1204 and outlet piping 1206 is connected to the manifold plate 1100.

Filter 1202 can include a filter housing 1208, a filter media 1210, and a media cage 1212. The filter can further include a flange 1214 configured to be engaged by locking ring 208. Seals 1216 can be provided to seal the connections of the filter 1202 to the manifold plate 1100. In an embodiment, at least some of the seals 1216 can provide sealing separating the inlet and outlet sides of divider 114. Filter housing 1208 forms an exterior of the filter. When in use, the space between filter housing 1208 and the filter media 1210 receives an inlet flow of fluid to be filtered, by way of the fluid passage 116 connected to the inlet piping 1204. The media cage 1212 retains and shapes the filter media 1210. The inlet flow of fluid passes through the filter media 1210, which can be any suitable filter media for the fluid to be filtered. Once the fluid has passed through the filter media 1210, it passes out of filter 1202 by way of the fluid passage 116 connected to outlet piping 1206.

Aspects:

It is understood that any of aspects 1-15 can be combined with any of aspects 16-20.

Aspect 1. A filter manifold, comprising:
at least one manifold plate, the manifold plate including:
a plate body having a first side and a second side, the second side opposite the first side;
at least two filter connections on the first side of the plate body, each filter connection including an outer wall and a divider;
at least two fluid line connectors extending from the second side for each of the at least two filter connections, each of the fluid line connectors including a fluid passage passing through the manifold plate in a thickness direction of the plate body, each fluid passage including an opening at the first side that is located within the outer wall or the divider of one of the filter connections,
wherein for each filter connection, at least one of the openings at the first side is located within the divider and at least one of the openings at the first side is located between the divider and the outer wall, and
each of the fluid passages of the fluid connectors being an independent path for fluid flow.

Aspect 2. The filter manifold according to aspect 1, wherein the filter manifold comprises a plurality of the manifold plates.

Aspect 3. The filter manifold according to any of aspects 1-2, wherein the fluid line connectors having openings located between the divider and the outer wall of two of the at least two filter connections are separated by a distance that is smaller than a distance between the fluid line connectors having openings located within the divider of each of said two of the at least two filter connections.

Aspect 4. The filter manifold according to any of aspects 1-3, wherein an outer side of each of the outer walls includes threading, the filter manifold further including a locking ring configured to engage the threading.

Aspect 5. The filter manifold according to aspect 4, further comprising a cap configured to cover one of the filter connections and wherein the locking ring is configured to retain the cap and a seal between the cap and one of the filter openings.

Aspect 6. The filter manifold according to any of aspects 4-5, wherein the locking ring includes one or more engagement features on an outer side of the locking ring.

Aspect 7. The filter manifold according to any of aspects 4-6, wherein the locking ring includes one or more engagement features on an upper surface of the locking ring.

Aspect 8. The filter manifold according to any of aspects 1-7, wherein the one or more manifold plates include a fluoropolymer.

Aspect 9. The filter manifold according to any of aspects 1-8, wherein the one or more manifold plates include a melt-processable polymer.

Aspect 10. The filter manifold according to any of aspects 1-9, wherein the plate body includes a basin surrounding the filter connections on the first side of the plate body.

Aspect 11. The filter manifold according to aspect 10, wherein the filter manifold further includes a drain fluid passage extending from the basin on first side to a connector provided on the second side of the plate body.

Aspect 12. The filter manifold according to any of aspects 1-11, including a plurality of void features extending into the plate body formed on one or more side walls of the plate body, the side walls each extending between the first side and the second side of the plate body.

Aspect 13. The filter manifold according to aspect 12, wherein the plurality of void features are each separated from one another by one or more ribs.

Aspect 14. The filter manifold according to aspect 13, wherein each of the ribs extends from one of the side walls to an opposite side wall, and each of the ribs passes between two of the fluid line connectors.

Aspect 15. The filter manifold according to any of aspects 12-14, wherein the first side of the plate body has an area greater than an area of the second side.

Aspect 16. A method of assembling a filter manifold, comprising:
providing one or more manifold plates, each of the manifold plates including: a plate body having a first side and a second side, the second side opposite the first side; at least two filter connections on the first side of the plate body, each filter connection including an outer wall and a divider; at least two fluid line connectors extending from the second side for each of the at least two filter connections, each of the fluid line connectors including a fluid passage passing through the manifold plate in a thickness direction of the plate body, each fluid passage including an opening at the first side that is located within the outer wall or the divider of one of the filter connections, wherein for each filter connection, at least one of the openings at the first side is located within the divider and at least one of the openings at the first side is located between the divider and the outer wall, and each of the fluid passages of the fluid connectors being an independent path for fluid flow;

connecting the one or more manifold plates to a support structure;

connecting piping to at least some of the fluid line connectors of the one or more manifold plates; and connecting a filter to one of the filter connections of the one or more manifold plates.

Aspect 17. The method according to aspect 16, wherein each of a plurality of filters are connected to one of the filter connections of the one or more manifold plates.

Aspect 18. The method according to aspect 17, wherein the piping is connected such that each of the plurality of filters are connected with one another such that a fluid flows the plurality of filters in series.

Aspect 19. The method according to any of aspects 17-18, wherein the piping is connected such that at least some of the plurality of filters are connected such that a fluid flows through said at least some of the plurality of filters in parallel with one another.

Aspect 20. The method according to any of aspects 16-19, further comprising installing a cap in each of the filter connections to which a filter has not been connected.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter manifold, comprising:
    at least one manifold plate, the manifold plate including:
    a plate body having a first side and a second side, the second side opposite the first side;
    at least two filter connections on the first side of the plate body, each filter connection including an outer wall and a divider; and
    at least two fluid line connectors extending from the second side for each of the at least two filter connections, each of the fluid line connectors including a fluid passage passing through the manifold plate in a thickness direction of the plate body, each fluid passage including an opening at the first side that is located within the outer wall or the divider of one of the filter connections,
    wherein for each filter connection, at least one of the openings at the first side is located within the divider and at least one of the openings at the first side is located between the divider and the outer wall, and
    wherein each of the fluid passages of the fluid connectors being an independent path for fluid flow.

2. The filter manifold of claim 1, wherein the filter manifold comprises a plurality of the manifold plates.

3. The filter manifold of claim 1, wherein the fluid line connectors having openings located between the divider and the outer wall of two of the at least two filter connections are separated by a distance that is smaller than a distance between the fluid line connectors having openings located within the divider of each of said two of the at least two filter connections.

4. The filter manifold of claim 1, wherein an outer side of each of the outer walls includes threading, the filter manifold further including a locking ring configured to engage the threading.

5. The filter manifold of claim 4, further comprising a cap configured to cover one of the filter connections and wherein the locking ring is configured to retain the cap and a seal between the cap and one of the filter openings.

6. The filter manifold of claim 4, wherein the locking ring includes one or more engagement features on an outer side of the locking ring.

7. The filter manifold of claim 4, wherein the locking ring includes one or more engagement features on an upper surface of the locking ring.

8. The filter manifold of claim 1, wherein the one or more manifold plates include a fluoropolymer.

9. The filter manifold of claim 1, wherein the one or more manifold plates include a melt-processable polymer.

10. The filter manifold of claim 1, wherein the plate body includes a basin surrounding the filter connections on the first side of the plate body.

11. The filter manifold of claim 10, wherein the filter manifold further includes a drain fluid passage extending from the basin on first side to a connector provided on the second side of the plate body.

12. The filter manifold of claim 1, including a plurality of void features extending into the plate body formed on one or more side walls of the plate body, the side walls each extending between the first side and the second side of the plate body.

13. The filter manifold of claim 12, wherein the plurality of void features are each separated from one another by one or more ribs.

14. The filter manifold of claim 13, wherein each of the ribs extends from one of the side walls to an opposite side wall, and each of the ribs passes between two of the fluid line connectors.

15. The filter manifold of claim 12, wherein the first side of the plate body has an area greater than an area of the second side.

* * * * *